United States Patent [19]

Le Guen et al.

[11] Patent Number: 4,603,623
[45] Date of Patent: Aug. 5, 1986

[54] INSTALLATION FOR THE PRODUCTION OF CHEESES

[76] Inventors: Annick Le Guen; Joseph Moutarde, both of 15, chemin de la Barre, 42210 Feurs, France

[21] Appl. No.: 645,355

[22] Filed: Aug. 29, 1984

[30] Foreign Application Priority Data

Aug. 30, 1983 [FR] France .................. 83 13872

[51] Int. Cl.$^4$ .................. A01J 25/00; A23C 19/00
[52] U.S. Cl. .................. 99/454; 99/452; 99/456; 426/36; 426/582
[58] Field of Search .................. 99/452–455, 99/456–459, 460, 465, 472, 467; 426/490, 491, 582, 583, 495, 36, 519, 34; 425/84, 85

[56] References Cited

U.S. PATENT DOCUMENTS

| 3,636,630 | 1/1972 | Budahn | 99/452 X |
| 4,108,057 | 8/1978 | Hain et al. | 99/452 |
| 4,309,941 | 1/1982 | Brockwell | 99/459 X |
| 4,321,861 | 3/1982 | Hain et al. | 99/455 |

Primary Examiner—Timothy F. Simone
Attorney, Agent, or Firm—Wenderoth, Lind & Ponack

[57] ABSTRACT

An installation for the production of cheeses, notably having lactic characters and of cheeses of the soft paste type, includes curdling basins each in the shape of a semi-sphere, devoid of inner equipment and provided with structure for ensuring the closing, transportation and handling thereof. A rotary metering device with several heads fills and meters milk into the basin. Vertical silos with an air-conditioned environment store of the basins during the entire duration of the time required for coagulation of the milk. A rotary device with several working heads cuts the curds, and vertical silos store the basins after the curd cutting operation. A device extracts the whey, and a molding machine with several heads molds the cheese. The transfer of the basins and of the plates supporting the molded cheeses is carried out with the assistance of automatic conveyor systems.

5 Claims, 3 Drawing Figures

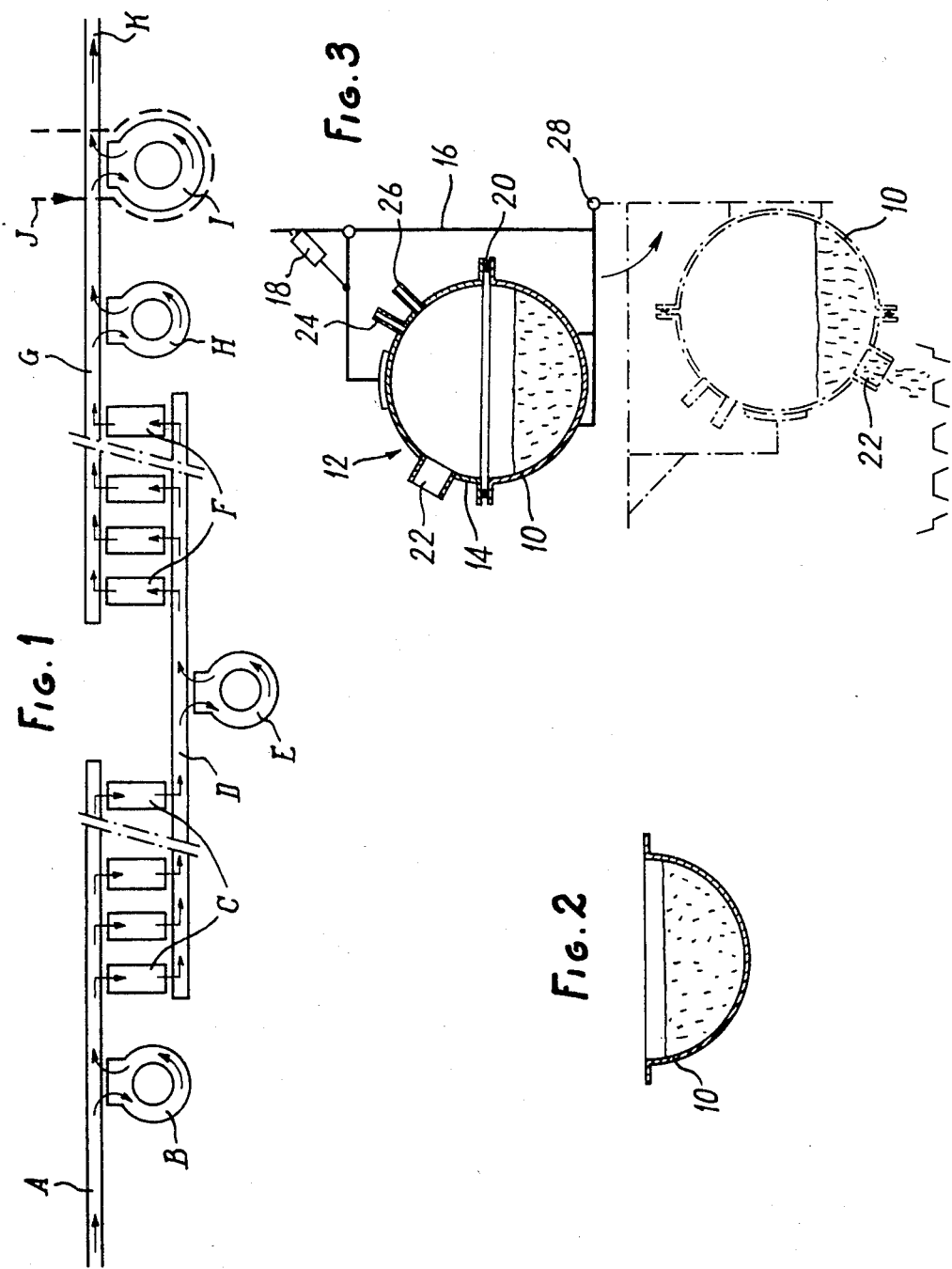

INSTALLATION FOR THE PRODUCTION OF CHEESES

FIELD OF INVENTION

This invention relates to an automatic installation for the production of cheeses, notably cheeses having lactic characteristics, or cheeses of the soft paste type.

PRIOR ART

It is known that the milk used in the production of cheeses is subjected to a number of preparations which are, in succession:

the adding of rennet and curdling;

the cutting of the curds, an operation often called "decurdling";

the spontaneous separation of the whey from the curds, with or without mechanical action;

the extraction of the whey;

the molding of the curds for the production of cheeses; and the draining of the cheeses thus obtained.

For carrying out such operations, there is employed at the present time an installation which is substantially comprised of:

containers for the curdling of the milk, the capacity of which can vary from a few tens of litres to several thousands of liters;

cheese molds or forms and form-blocks;

plates for receiving the forms or the form-blocks; and draining tables on which are placed the forms or the form plates.

In such known installations, the handling of the curdling containers and of the plates is carried out either manually or mechanically.

For the production of molded cheeses having lactic characteristics, ones uses curdling containers made in the shape of basins the capacity of which varies generally from about 50 to 300 liters. The molding operation is effected manually. For very fragile cheeses, a ladle is used, the cheese maker taking a ladlefull of curds which he pours cautiously into a form. It is therfore a lengthy and costly operation. For cheeses requiring less caution, a curds shovel is used. The cheese maker deposits the curds into a distributor or multi-form. This operation is quicker than the previous one, but is still carried out manually.

The molding of cheeses the paste of which is soft, flowry, washed, stirred, etc., requires fewer precautions. In such an operation, the curdling of milk is carried out in containers of various shapes and very variable capacities. For relatively small capacities (up to about 200 liters), containers of cylindrical, frustoconical, cubical, parallelepipedic, etc. shape are used, generally called "basins". For greater capacities, tanks of verious shapes are used, equiped with devices for the working out of the curds and, sometimes, with a vacuum system for regulating the drawing speed of the curds-whey mixture. The major disadvantage of the large tanks resides in the fact that the distribution of the curds in the forms is difficult. The cheeses obtained are irregular and their weight is very variable. In the case of cheeses sold by the piece, the profitability is low.

For reducing costs, mechanical systems designed for handling the basins and for storing them on horizontal conveyors and for emptying the basins have been made in the course of the past years. Such mechanical systems, known as "basin tippers", are provided with hydraulic or pneumatic jacks and they allow emptying the curds contained in the basin for feeding a distributor. Depending on the types of equipment and the yields required by the users, the operation is more or less brutal.

Such a type of equipment requires a molding chain for a tipper, since if one wishes to carry out a smooth molding operation and obtain very high cadences or frequencies several apparatus are needed and therefore several molding lines. The maximum cadence of such installations is around 180 basins/hour. In order to increase the hourly volume of curds, the basin capacity is increased, but the distribution of the curds from the forms is not as good and the profitability diminishes in the case of cheeses sold by the piece.

OBJECTS AND SUMMARY OF INVENTION

The object of the present invention is to provide an installation allowing curdling the milk and mechanically molding the curds obtained, while retaining for the cheeses their specific characteristics.

To this effect, this invention relates to an installation for the production of cheeses, notably cheeses having lactic characteristics and cheeses of the soft paste type, characterized in that it uses curdling basins in the shape of semi-spheres devoid of internal equipment and provided with means for their closing, transportation and handling, and in that it comprises a rotary metering device with several heads for filling and metering of the milk into the basins, vertical silos with an air conditioned environment for storing the basins for the entire duration of the time required for coagulation, a rotary device with several working heads for cutting the curds, vertical silos for storing the basins after the cutting of the curds, a device for the extraction of whey and a molding machine with several heads, the transfer of the basins and of the plates supporting the molded cheeses being effected with the assistance of automatic conveyor systems.

According to the invention, the molding machine is a rotary circular machine with several heads, the number of heads varying as a function of the yield, each molding head comprising a semi-spherical bell the dimensions of which are identical to those of the curdling basins, each of the bells including means for forming a tight seal with the basin, an automatic drain valve, an automatic vacuum socket and a vacuum breaker.

Further features and advantages of this invention will become more apparent from the following description, with reference to the accompanying drawnigs illustrating an embodiment thereof and not limiting the scope of the invention.

BRIEF DESCRIPTION OF DRAWINGS

In the drawings:

FIG. 1 is a schematic view showing an installation according to the invention,

FIG. 2 is a sectional view of a curdling basin according to the invention, and

FIG. 3 is a schematic representation of one of the heads of a moulding machine.

DETAILED DESCRIPTION OF INVENTION

The installation according to the invention uses a curdling basin 10 (FIG. 2) having the shape of a semi-sphere, which allows imparting to the curds a motion in all directions, without breaking the curds. The capacity of basin 10 is variable, and it can vary from 30 to 100 liters for the production of cheeses sold by the piece, to higher values for cheeses sold by weight. The curdling basin does not include any inner equipment, i.e. it has an uncluttered interior which is entirely smooth, and can be provided with various equipments (not shown) for its mechanical transportation, its positioning at the various stations of the installation and its closing, as will be seen hereafter, by means of an identical semi-sphere.

Reference being made to FIG. 1, ones sees that the installation according to the invention comprises substantially:

a conveyor system A for transferring empty curdling basins;

a filling and metering device B for filling milk in the curdling basins;

a storing system C for storing the filled basins for the duration of the time required for coagulation of the milk therein;

a conveyor system D for transferring the basins containing the curds to a curds cutting station;

a cutting device E for the curds (or decurding device);

a storing installation F for storing the basins containing the cut out curds;

a conveyor G for transferring the basins to the following station;

an extraction device H for removing the whey;

an automatic molding machine I associated with a conveyor J for plates; and a conveyor system K for taking away the empty basins towards a washing tunnel and for returning them to the filling device B.

The filling and metering device B for filling the milk into the curdling basins is, according to the invention, in the form of a rotary metering system, of the type employed for filling bottles, the filling of the basins supplied by conveyor A being effected on a continuous basis.

After filling, the basins filled with milk are conveyed into the storage installation C which, according to the invention, comprises a plurality of vertical air-conditioned and mechanized silos, the basin input and output being effected automatically. Such storage system represents an important improvement with respect to the system used at present and according to which the storage of the curdling basins is made either directly on the ground or on horizontal conveyors, which results in a great space requirement on the ground. On the other hand, during the entire duration of the time of milk coagulation in the basins, the temperature of the storage chamber is kept high, at a value of the order of 22° to 40° C., according to the type of cheese produced, and the result is that the working conditions are often difficult for the cheese makers, and all the more since the humidity is high. The characteristics of the invention, according to which the curdling basins are stored in air-conditioned silos, makes it possible to reduce the space requirement on the ground and to obtain more agreeable temperatures in the working rooms. On the other hand, the cleaning of the storage silos and of the inner equipment thereof (chains, conveyors, driving wheels and rollers, etc.) is carried out in a closed circuit.

The basins containing the curds and coming from the storage silos C are delivered continuously by conveyor D to the decurdling device E. It is known that at the present time the cutting operations of the curds, or decurding operations, are carried out manually with a curd knife or cutter. In the installation according to the invention, one uses a rotary machine including several working heads the number of which varies as a function of the required cadence. The working heads are equipped with curd knives adapted to each type of cheese and possibly with a wash plate for stopping the curd mass. The cutting operation of the curds is effected in one or several motions. At the end of the decurding operation, the basins are successively transferred by conveyor D into storage silos F.

Prior to the molding operation, the basins containing the cut out curds are successively brought to the whey extraction station where there is provided a rotary machine H comprising one or several pumping heads, as a function of the cadences. Each whey pumping head is provided with a filter and the basin can possibly be placed in an inclined position.

After extraction of the whey, the basins are conveyed, still continuously, to the molding station by means of conveyor G. The molding station is equipped with moulding machine I which, according to the invention, meets the following requirements:

(a) the provision of various molding cadences, depending on the draining speed of the basins containing the curds;

(b) possibility of setting the draining speed as a function of the consistency of the curds;

(c) possibility of adapting the equipment to an automated chain.

In order to meet such requirements, the invention uses a molding machine of the circular type with several working heads operating such that the time which elapses from the moment a basin is introduced into the machine and the moment when it leaves the machine is constant, independently of the speed and molding cadence. To this effect, the molding machine according to the invention is in the shape of a system of a design close to that of a bottle filler with multiple heads, the diameter and number of heads increasing as the yield increases. In order to increase the possibility of molding several types of cheeses on the same machine and to make it very polyvalent, it is equipped with a variable speed motor.

For example: a molding machine will mold 200 basins of 50 liters each per hour with soft pastes, that is 10,000 liters/hour. The residence time of a basin in the machine being about one minute, by changing the speed, from 80 to 100 basins of 50 liters each of lactic curds, which are much more fragile, will be molded, the residence time being then increased to 2 minutes or more.

FIG. 3 shows schematically a molding head, indicated as a whole by reference numeral 12, equipping the molding machine according to the invention. One sees that the molding head 12 includes substantially a semi-spherical bell 14 the dimensions of which are identical to those of the curdling basins 10, an articulated frame 16 supporting the bell and appropriate clamping means, notably a jack 18, for applying and maintaining bell 14 on a basin 10 containing the curds. Bell 14 is equipped with a joint system 20 for forming a seal with the curd basin 10 on which it is positioned during draining thereof, an automatic drain valve 22, an automatic vacuum socket 24 and a vacuum breaker 26.

The operation is as follows:

After tightening bell 14 on basin 10 with the assistance of jack 18, a partial vacuum is formed inside the bell. The the assembly is pivoted about articulation point 28 of frame 16 until the drain valve 22 reaches the lowest point. At that moment, valve 22 opens entirely and the curds flow onto the distributor plate which is carried by conveyor J (FIG. 1), the flowing speed varying as a function of the value of the vacuum prevailing in the bell.

The empty basins then are taken over by conveyor K in order to pass through a washing installation, and the washed basins are returned to the filling installation B.

After molding, the cheeses are directed towards draining rooms, preferably air-conditioned, or to prefabricated draining cells, comprising an air-conditioning installation, a conveyor system and cleaning means in a closed circuit. Depending on the situation:

the cheeses remain in the same cell where the temperatures of the air vary as a function of the degree of draining;

the cheeses pass through the cells where the temperatures are different as a function of their degree of draining.

From the hereabove description it will be apparent that the invention makes possible the continuous and automatic production of cheeses, allowing the coagulation and molding of cheeses having lactic characters or of cheeses of the soft paste type at cadences or frequencies varying from a few hundreds of liters per hour to more than 25,000 liters/hour.

Obviously, this invention is not limited to the embodiment shown and described but rather encompasses all variations thereof.

What I claim is:

1. An installation for the production of cheeses, particularly cheeses having lactic characteristics and cheeses of the soft pasty type, said installation comprising:
   a plurality of basins of semi-spherical shape and having uncluttered smooth interiors;
   rotary means for metering milk into said basins;
   first conveyor means for passing said basins sequentially into said rotary metering means, whereat said basins are filled with milk, and for removing the thus filled said basins from said rotary metering means;
   first vertical air-conditioned silos for receiving said filled basins from said first conveyor means and for storing said filled basins for the entire duration of the time required for coagulation of said milk, thereby forming curds in said basins;
   rotary means for breaking up said curds in said basins;
   second conveyor means for transferring said curd containing basins from said first silos into said rotary curd breaking up means, whereat said curds in said basins are broken, and for removing therefrom said basins containing said broken curds;
   second vertical silos for receiving from said second conveyor means and for storing said broken curd containing basins, during which whey separates from said curds;
   means for extracting the thus separated whey from said curd containing basins;
   rotary molding means for transferring said curds from said basins to molds; and
   third conveyor means for transferring said basins containing separated curds and whey from said second silos to said extracting means, and for transferring said curd containing basins from said extracting means to said molding means.

2. An installation as claimed in claim 1, wherein said whey extracting means comprises a rotary mechanism.

3. An installation as claimed in claim 1, wherein said molding means comprises a rotary machine having at least one head rotated by a variable speed motor.

4. An installation as claimed in claim 3, wherein each said head comprises a semi-spherical bell of dimensions equal to those of said basins, means for tightly sealing said bell to a respective said basin, means for creating a vacuum within the thus sealed bell-basin assembly, valve means for draining said curds from said assembly, and means for breaking the vacuum within said assembly and allowing separation of said bell from said basin.

5. An installation as claimed in claim 1, further comprising fourth conveyor means for supplying said molds to said molding means to receive therefrom said curds and for removing therefrom curd containing molds.

* * * * *